INVENTOR.
THOMAS L. DALE
BY
Francis J. Krembles Jr.
ATTORNEYS

United States Patent Office

3,546,825
Patented Dec. 15, 1970

3,546,825
METHOD FOR RENEWING WIPER BLADE EDGES
Thomas L. Dale, 5193 Mapleridge Drive,
Columbus, Ohio 43227
Filed Dec. 11, 1968, Ser. No. 782,938
Int. Cl. B24b 1/00
U.S. Cl. 51—323                3 Claims

ABSTRACT OF THE DISCLOSURE

The present invention relates to a method for renewing used windshield wiper blades wherein a rubber cleaning material is first applied to the wiping edge of a used wiper blade. The wiping edge is then moved over the surface of an abrasive material to remove substantially all oxidized rubber particles and any other foreign matter that has accumulated on the edge. Preferably the abrasive material is in the form of a sheet which fits over the windshield of a vehicle so that upon actuation of the vehicle wiper mechanism, the wiping edges of the blades are repeatedly moved over the abrasive material. A rubber preservative may then be applied to the cleaned wiping edges.

---

Figure 1:
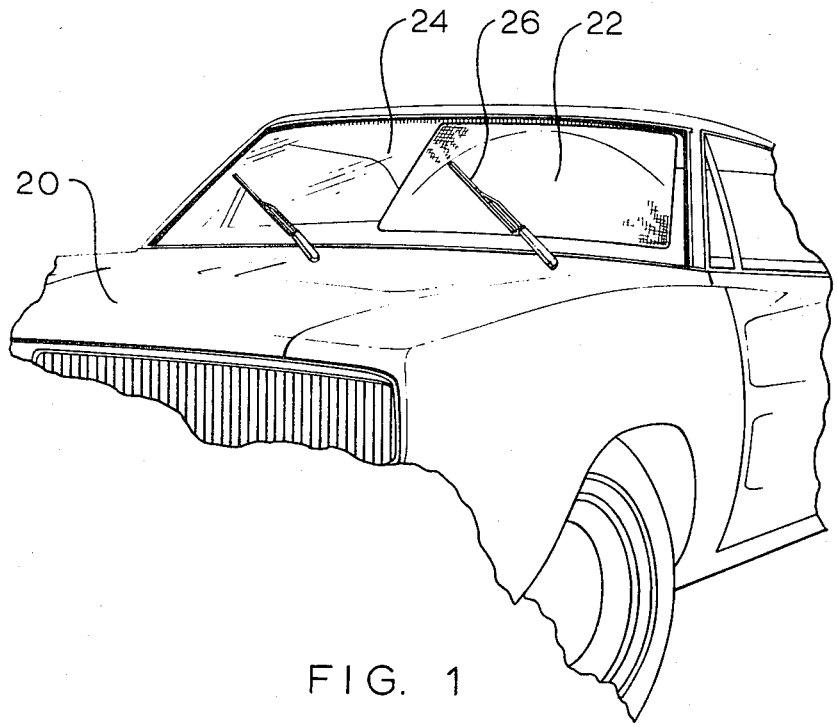

The present invention relates generally to a method for renewing used windshield wiper blades wherein used, ineffective wiper blades may be renewed efficiently and inexpensively.

It has been recognized that one of the more serious defects in vehicles relating to safety is ineffective windshield wiper blades. Although probably most motorists at one time or another have experienced the visual difficulties during a rainstorm caused by worn wiper blades, there are many reasons contributing to the general public apathy toward correcting this defect.

One of these reasons is the expense involved in purchasing new blades which probably causes vehicle owners to wait until the wiper blades on their vehicle are almost totally ineffective. However, at this time a substantial period has already passed in which the driver has been driving with wiper blades that have been ineffective over varying degrees and which represent a great safety hazard.

It is therefore an object of the present invention to provide a method for renewing the wiping edge of used windshield wiper blades in a simple, quick and efficient manner.

It is another object of the present invention to provide a method for renewing the wiping edge of used windshield wiper blades inexpensively such that cost will be removed as a substantial factor to vehicle owners in rationalizing the delay of correcting defective and ineffective windshield wiper blades.

It is another object of the present invention to provide a method for renewing the wiping edge of used windshield wiper blades that may be adapted for use by service stations and the like in such a manner that permits the wiping edge to be renewed during approximately the same time interval that gasoline and oil are also provided.

It is still another object of the present invention to provide a method of the type described which permits the wiping edge of used windshield wiper blades to be renewed without removing the wiping element from the wiper blade assembly or the wiper blade assembly itself from the vehicle.

It is a further object of the present invention to provide a method of renewing used windshield wiper blades which permits used blades to be renewed to a condition that permits resale in competition with new blades.

Further objects and advantages of the present invention will be apparent from the following description, reference being had to the accompanying drawings wherein a preferred form of embodiment of the invention is clearly shown.

Figure 2:
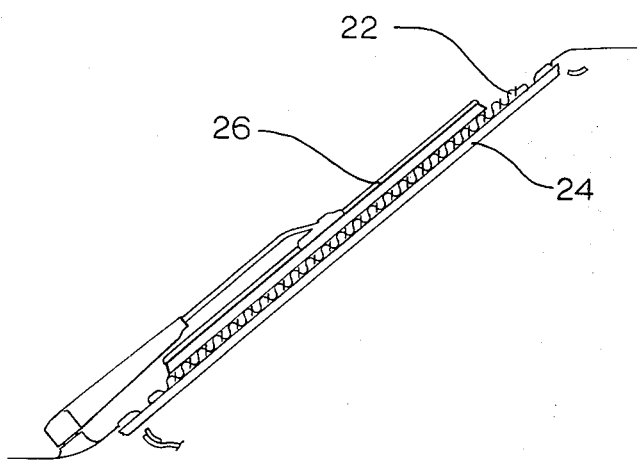

In the drawings:

FIG. 1 is a perspective view of an automobile and the flexible pad that may be used to practice the method of the present invention; and FIG. 2 is a partial side view of a vehicle windshield and wiper blade assembly with the flexible pad shown in FIG. 1 positioned on the windshield.

Referring in detail to the drawings the method of the present invention will be described specifically with reference to a conventional automobile indicated generally at 20 in FIG. 1.

In the preferred embodiment of the present invention, the novel method is particularly suited for use in service stations or other places of business where vehicle maintenance is practiced.

Assuming a service station practices the present invention, as a vehicle enters the station for gasoline and oil, the operator of the station may ask the motorist if the present wiper blades are performing properly and offer to perform a simple check of their efficiency by wetting the windshield and turning on the wiper blades. This procedure could easily become as commonplace as checking the radiator and battery for example.

If the wiper blades are worn to a degree wherein noticable ineffectiveness is evidenced by streaking and the like, a safety hazard is present which should be remedied. Of course, new blades would be a solution, however, the cost of new wiper blades is such that many motorists ignore the condition of their wiper blades or procrastinate to such a degree that they operate the vehicle for a long period during which the wiper blade represent a major safety hazard particularly during a heavy rainstorm.

Using the method of the present invention, the used wiper blades may be renewed to high efficiency in a matter of minutes and at extremely low cost.

If the motorist requests that his used blades be renewed, the service station operator would place a flexible pad 22 over the area of the vehicle windshield 24 which covers approximately all the area covered by the path of the wiper blade 26 over the windshield.

Pad 22 includes an outwardly facing surface of abrasive material, preferably comprising a woven, tufted or flocked material, such as for example, nylon, wool or the like.

This abrasive material is preferably mounted on a rubber or plastic backing sheet by a suitable adhesive to enhance durability. The flexibility of pad 22 permits it to conform to the contour of most windshields even those having the more extreme "wrap around" design.

It should also be pointed out that pad 22 may be of such dimensions that it covers both sides of the windshield or it may cover only one side as shown in FIG. 1, without departing from the spirit of the present invention. As shown in FIG. 1, the operator would use two pads to renew both wiper blades at the same time.

After pad 22 is properly positioned on windshield 24, a rubber cleaning compound, such as the rubber thinner and cleaning solution manufactured by Gates Engineering Company of Wilmington, Del., identified as N–450–11 and sold under the trademark of "Gaco," is applied to the wiping edge of blades 26. It is important to point out however that other substances that will function to clean rubber and aid in the removal of oxidized rubber may be used without departing from the spirit of the present invention.

There are various ways the cleaning compound may be applied, however, it is an easy step to merely pour or spray the cleaning compound onto the wiping edges of blades 26.

Then the windshield wiper assemblies are actuated so that the wiper blades move over the abrasive surface of pad 22 in their normal manner.

The repeated contact of blades 26 with the abrasive surface of pad 22 removes oxidized rubber particles, road tars, dirt, and corrosive contaminants from the wiping edges of wiper blades 26. These foreign substances are the major cause of ineffective wiping of the windshield surface because they destroy the relatively smooth wiping edge that new blades possess.

The number of times the blades 26 must go back and forth across pad 22 to be renewed to a condition substantially equivalent to an unused wiper blade depends upon the quantity of foreign substances collected upon the blade. However, most blades can be effectively renewed in much less than five minutes. When an operator becomes efficient, the total time for the whole procedure beginning with the placement of pad 22 until the blades are completely cleaned is less than five minutes. Therefore while the motorist is obtaining his gasoline or oil, for example, this procedure could be accomplished with little or no additional delay.

After the wiping edges of blades are completely renewed and pad 22 removed from the windshield, it is preferable that the operator apply a rubber preservative, such as a molybdenum sulfide compound manufactured by the Dow Chemical Company, to all of the surface area of the blades 26, but particularly to the wiping edges.

This may be done quickly by merely wiping each wiper blade with a cloth or sponge for example, to which the preservative compound had been applied. The rubber preservative prolongs the elasticity of the rubber blade and protects it from contaminants and therefore prolongs the effective life of the blade.

It should readily be understood from the foregoing description that the method of the present invention permits a motorist to renew the wiping edge of wiper blades in a convenient, inexpensive and highly efficient manner. Furthermore, it provides an opportunity for frequent checks of the efficiency of vehicle wipers blades by service station attendants or the like to promote a more alert attitude toward reducing a safety hazard which is far too much overlooked at the present by the great majority of motorists. Since convenience is relatively great and expense low, it also should tend to encourage motorists to be more diligent in remedying the hazard of ineffective wiper blades.

It should be pointed out that the method of the present invention also provides a means for renewing used wiper blades for resale at much lower cost than a new blade and without any substantial loss of effectiveness compared to new blades.

Many used blades which have in the past been discarded when new wiper blades were purchased could be renewed using the principles of the present invention and offered for resale to motorists whose wiper blades are so damaged that they could not be renewed. For example, if the wiping edges of a blade are torn or have deep gouges, they must be replaced.

Any number of means or apparatus could be devised to renew wiper blades in accordance with the method of the present invention in which a large or small number of used blades would be moved over an abrasive surface with a rubber cleaning compound first being applied to the wiping edge. Of course, one blade at a time could be renewed manually, if desired.

The renewed blades should then be treated with a rubber preservative and could be repackaged for sale.

While the form of embodiment of the present invention as herein disclosed constitutes a preferred form, it is to be understood that other forms might be adopted, all coming within the scope of the claims which follow.

I claim:
1. A method for renewing the wiping edge of used windshield wiper blades comprising, in combination, the steps of applying a rubber cleaning material to at least the wiping edge of a windshield wiper blade; and repeatedly rubbing said wiping edge over the surface of an abrasive material until substantially all oxidized rubber particles and other foreign matter is removed from said wiping edge.

2. The method defined in claim 1 including applying a rubber preservative compound to at least the wiping edge of said wiper blade after the oxidized rubber particles and other foreign matter have been removed.

3. A method for renewing the wiping edge of used windshield wiper blades comprising the steps of removably mounting a flexible sheet of material provided with an outwardly facing abrasive surface on a windshield of a vehicle in alignment with substantially the normal area covered by the path of the windshield wiper blades in motion over the vehicle windshield; applying a rubber cleaning solution to at least the wiping edge of the used wiper blade; and actuating the windshield wiper blade assembly to move the wiping edge of the wiper blades repeatedly over said abrasive surface to remove oxidized rubber particles and foreign substances from the wiping edge.

References Cited
UNITED STATES PATENTS

| | | | |
|---|---|---|---|
| 1,192,424 | 7/1916 | Hochstetter | 51—323X |
| 1,569,402 | 1/1926 | Slye. | |
| 1,903,101 | 3/1933 | Faley | 51—241X |

LESTER M. SWINGLE, Primary Examiner

U.S. Cl. X.R.

51—241; 15—250